United States Patent [19]

Ueda et al.

[11] Patent Number: 4,838,670

[45] Date of Patent: Jun. 13, 1989

[54] PROJECTION LENS FOR A PROJECTOR

[75] Inventors: Kiichirou Ueda, Kunitachi; Norikazu Arai, Komae, both of Japan

[73] Assignee: Konishiroku Photo Industry Co., Ltd., Tokyo, Japan

[21] Appl. No.: 92,035

[22] Filed: Sep. 2, 1987

[30] Foreign Application Priority Data

Sep. 5, 1986 [JP] Japan .................................. 61-207999
Dec. 12, 1986 [JP] Japan .................................. 61-294944
Jul. 29, 1987 [JP] Japan .................................. 62-187735

[51] Int. Cl.⁴ .......................... G02B 13/18; G02B 9/60
[52] U.S. Cl. .................................... 350/432; 350/412; 350/465
[58] Field of Search ...................... 350/432, 465, 412

[56] References Cited

U.S. PATENT DOCUMENTS

| | | | |
|---|---|---|---|
| 4,682,862 | 7/1987 | Moskovich | 350/412 |
| 4,691,996 | 9/1987 | Cho | 350/432 |
| 4,733,953 | 3/1988 | Yamamoto et al. | 350/432 |
| 4,761,063 | 8/1988 | Yoshioka et al. | 350/412 |

*Primary Examiner*—Bruce Y. Arnold
*Assistant Examiner*—Rebecca D. Gass
*Attorney, Agent, or Firm*—Jordan B. Bierman; Bierman and Muserlian

[57] ABSTRACT

A five unit projection lens for a projector composed of, in order from the screen side, a first positive lens unit having at least one aspherical surface, a second negative lens unit comprising a double concave lens, a third positive lens unit, a fourth lens unit, and a fifth negative lens unit with a concave surface having a great curvature directed toward the screen.

6 Claims, 7 Drawing Sheets

PROJECTION LENS FOR A PROJECTOR

DETAILED DESCRIPTION OF THE INVENTION

1. Industrial Applicability

This invention relates to a projection lens for a projector used for television projectors and the like.

2. Prior Art

The television projector is used to enlarge and project an image plane of a cathode-ray tube on a screen by a projection lens and recently has a great prospect for spread into homes and the like. There is a great demand for compactness and less-cost of a projector device. With this, the projection lens has been demanded which has a large aperture of the order of aperture ratio (1 : 1.0) and an extremely wide angle in which half angle of view is above 28°. Many projection lenses whose half angle of view is of the order of 27° to 32° which responds to such a demand have been known. The basic structure of the projection lens can be classified into three kinds as follows:

Type 1: A three-group structure consisting of a first lens unit having a positive refracting power, a second lens unit having a positive refracting power and a third lens unit having a negative refracting power.

Type 2: A three-group structure consisting of a first lens unit having a negative refracting power, a second lens unit having a positive refracting power and a third lens unit having a negative refracting powder.

Type 3: A four-group structure consisting of a first lens unit having a positive refracting power, a second lens unit having a negative refracting power, a third lens unit having a positive refracting power and a fourth lens unit having a negative refracting power.

It is to be noted of course that each group can be of a laminated lens for the correction of chromatic aberration, spherical aberration and the like as needed, or can be sometimes divided.

The lens of the Type 1 is capable of making a large aperture ratio but when it is made into a wide angle, there poses a conspicuous disadvantage that a sagittal flare is large.

One example of the lens of the Type 2 is disclosed in Japanese Patent Application Laid-Open No. 145517/1986. The lens of this type is advantageous for a wide angle but in the lens having a large aperture, the positive lens of the second group need be greatly increased in size, entailing a rise in cost. Furthermore, the correction of chromatic aberration of magnification is difficult.

The Type 3 is an intermediate type between the Type 1 and Type 2, an example of which can be seen in Japanese Patent Application Laid-Open No. 249014/1986. This unavoidably deteriorates the performance in the periphery of the image plane.

In the lenses of these types, the half angle of view is wide of the order of 35°, a cathode-ray tube whose fluorescent surface is a spherical surface or an aspherical surface to realize a bright lens. As lenses for a projector used for such cases, the lens of Type 1 is disclosed in Japanese Patent Application Laid-Open No. 200216/1985; that of Type 2 disclosed in Japanese Patent Application Laid-Open No. 145517/1986; and that of Type 3 disclosed in Japanese Patent Application Laid-Open No. 180215/1986. However, generally, a lens for a projector which uses a cathode-ray tube whose fluorescent surface is a plane is being widely used. Therefore, at present, a projection lens for a projector having a high performance to the periphery of the image plane while using a cathode-ray tube whose fluorescent surface is a plane has been requested.

SUMMARY OF THE INVENTION

This invention is intended to provide a projection lens for a projector, which lens is mounted on a projector utilizing a cathode-ray tube whose fluorescent surface is a plane heretofore used, in which an aperture ratio is large, of the order of 1 : 1.0; the half angle of view is wide angle, above 28°; less-cost can be expected; aberrations are well corrected; and high quality of images may be obtained.

Moreover, in prior art, in the case of a three-tube type color projector, each lens projects blue, green and red images, and therefore no achromatism has been needed. However, to obtain a high resolving power and contrast, achromatism is needed. So the invention is intended to provide a projection lens for a projector which can provide also achromatism.

For achieving the above-described object, the projection lens for a projector according to this invention comprises, five lens units arranged in order from a screen side, consisting of a first positive lens unit $G_1$, a second negative lens unit $G_2$, a third positive lens unit $G_3$, a fourth lens unit $G_4$ having a relatively small power, and fifth negative lens unit $G_5$ with a concave surface having a great curvature directed toward the screen, at least one surface of the first lens unit having an aspherical surface.

In the conventional projection lens of Type 3, when the half angle of view is of the order of 30°, the quality of image in the periphery of the image plane is extremely deteriorated as described above. Therefore, in the present invention, between the third positive lens unit and the negative lens unit with the concave surface having a great curvature directed toward the screen is arranged the fourth lens unit having a relatively small power whereby the coma aberration in the meridional direction mainly in the periphery of the image plane may be corrected to obtain an image of good quality from the center of the image plane to the peripheral portion. Furthermore, by use of an aspherical surface for the first lens unit, the aberration caused by aperture can be effectively corrected. Moreover, by use of an aspherical surface for the fourth lens unit, the coma aberration in the meridional direction in the vicinity of the periphery of the image plane can be further well corrected.

In the case where F-number is 1.00 which is bright and the half angle of view is of the order of 30°, the following conditions are desired to be fulfilled.

GROUP 1

(1) $-1.00 < f/(f_2 n_2) < -0.02$ (2) $-0.5 < f/f_{12} < 0.2$ where f: Synthetic focal length of the whole system $f_2$: Focal length of the second lens unit $f_{12}$: Synthetic focal length of the first and second lens units $n_2$: Refractive index of the second lens unit This lens is further secondarily desired to fulfill the following conditions in order to enhance the performance.

In case that lens unit $G_3$ is made of glass;

(3) $-0.1 < f/f_4 < 0.7$ (4) $v_1 > 50$, $v_2 < 40$, $v_3 > 50$, $v_4 > 50$ where $f_4$: Focal length of the fourth lens unit $v_i$: Abbe's number of the with lens unit According to the lens of this invention, the first lens unit is made into an aspherical surface whereby the aberration caused by aperture is well corrected, and the coma aberration in the meridional direction where the angle of view is large is well corrected to enhance the performance of the periphery of the image plane.

The condition (1) is concerned with the focal length $f_2$ of the second lens unit $G_2$ and the refractive index $n_2$ thereof. When exceeding the upper limit, the astigmatic difference becomes large, and particularly the contrast in the portion where the angle of view is large lowers. Conversely, when exceeding the lower limit, the introversive coma aberration occurs in the portion where the angle of view is large, lowering the resolving power.

The condition 2 is concerned with the focal length $f_1$ of the lens unit $G_1$ and the focal length $f_2$ of the second lens unit $G_2$ with respect to the synthetic focal length $f$ of the whole system. When exceeding the upper limit, even if a material having a small Abbe's number is used for the second lens unit $G_2$ which is the negative lens, the chromatic aberration cannot be made small sufficiently, making it difficult to obtain the high resolution and high contrast. Conversely, when exceeding the lower limit, the sagittal flare becomes large, and the contrast in the portion where the angle of view is large is lowered.

The condition (3) is established, by fulfilling the condition (3), to effectively minimize variation in backfocus with respect to the variation in temperature of the whole lens system, in the case where a material wherein variation in refractive index with respect to variation in temperature is great, such as a plastic lens, is used for the fourth lens unit $G_4$.

The condition (4) is established, by fulfilling the condition (4), to make it possible to properly correct the chromatic aberration.

On the other hand, in the case where F-number is 1.04 which is slightly dark but the half angle of view is of the order of 35°, the following conditions are desired to be fulfilled.

GROUP 2

(5) $-2.0 < f_2/f_{12} < -0.3$ where $f_2$: Focal length of the second lens unit $f_{12}$: Synthetic focal length of the first and second lens units and (6) $-0.15 < f/f_4 < 0.25$ (7) $0 < d_2/d_4 < 1.8$ where $f$: Synthetic focal length of the whole lens system $f_4$: Focal length of the fourth lens unit $d_2$: Distance from the first lens unit to the second lens unit $d_4$: Distance from the second lens unit to the third lens unit The condition (5) is concerned with the power distribution of the first lens unit and the second lens unit. When exceeding the upper limit, the refracting power becomes too great, and the extrovert coma aberration is large in the portion where the angle of view is small. On the other hand, when exceeding the lower limit, the refracting power of the second lens unit becomes too small, and the sagittal flare increases as in the above-described Type 1. Even if the meridional coma aberration is corrected by the fourth lens unit, the half angle of view is 30° to 35° and the contrast lowers.

The condition (6) shows that the refracting power of the fourth lens unit is basically approximately 0. When exceeding the upper limit, the extrovert coma aberration becomes large in the portion where the angle of view is large. Conversely, when exceeding the lower limit, the introversive coma aberration becomes large in the portion where the angle of view is large.

In the condition (7), when exceeding the upper limit, the over-sagittal flare occurs. To correct this, at least one surface of the first lens unit has to be designed to be an aspherical surface whose aspherical surface area having an inflection point is large. The manufacture is difficult and the cost rises. When exceeding the lower limit, the under-magnification chromatic aberration becomes large. In the television projector, there occurs a color deviation caused by spectral distribution of fluorescence.

In the case where the first lens unit comprises a meniscus lens for correction of the sagittal coma flare, the following conditions are desired to be fulfilled.

GROUP 3

(8) $0.01 < d_4/d_2 < 1.0$ (9) $0.7 < f/f_{3,4} < 1.6$ where $d_2$: Distance from the first lens unit to the second lens unit $d_4$: Distance from the second lens unit to the third lens unit $f$: Focal length of the whole system $f_{3,4}$: Synthetic focal length of the third and fourth lens units The following conditions are further desired to be fulfilled.

(10) $-0.3 < f/f_4 < 0.3$ (11) $v_2 < 40$, $50 < v_3$ where $f$: Synthetic focal length of the whole lens system $f_4$: Focal length of the fourth lens unit $v_i$: Abbe's number of the lens constituting the ith lens unit If only the lens G among projection lenses R, G and B is achromatic, the achromatic condition may be eased to weaken the power of the fourth lens unit and relieve the condition of $v$.

The condition (8) is concerned with the distance from the first lens unit to the second lens unit and the distance from the third lens unit to the fourth lens unit. When exceeding the upper limit, the under-sagittal flare occurs, and the contrast of the peripheral portion lowers. When exceeding the lower limit, it becomes difficult to properly correct the distortion.

The condition (9) is concerned with the synthetic power of the third lens unit and the fourth lens unit. When exceeding the upper limit, the sagittal flare increases in the portion where the angle of view is large. Even if the coma aberration is corrected by the fourth lens unit, the contrast lowers in the periphery. When exceeding the lower limit, the power of the first lens unit increeases, and the relative illumination is insufficient.

The condition (10) is concerned with the power of the fourth lens unit. When exceeding the upper limit, the extrovert coma aberration becomes large in the portion where the angle of view is large. Conversely, when exceeding the lower limit, the introvert coma aberration becomes large.

The condition (11) is established, by fulfilling the condition (11), to make it possible to properly correct the chromatic aberration.

EMBODIMENTS

Embodiments of this invention will be described hereinafter. In the following tables, symbols are:

$r_i$: Radius of curvature at the apex of the ith lens surface from the screen side $d_i$: Distance between surfaces of the ith lens from the screen side $n_i$: Refractive index with respect to the line e of material of the ith lens from the screen side (Group 2)

Refractive index with respect 543 mm material of the ith lens from the screen side (Group 1, 3)

$v_i$: Abbe's number of material of the ith lens from the screen side.

In the cross coordinate system in which the apex of the surface is the origin and the optic-axial direction is the axis X, if C, K, $A_i$ and $P_i$ ($P_i < 2.0$) respectively represent the curvature of apex, the constant of cone, the coefficient of aspherical surface, and the power of aspheric surface, then the aspherical surface is defined by the equations:

$$X = \frac{C \phi^2}{1 + \sqrt{1 - (1 + K)C^2 \phi^2}} + \Sigma_i A_i \phi^{P_i}$$

$$\phi = \sqrt{y^2 + z^2}$$

It is noted that in the tables, the value of the face plate F is also given, being indicated as the fifth lens unit including said value.

It is also noted that in the tables, the value of liquid layer Liq filled between the fifth lens unit and the face plate F is also given along with the face plate F. By the provision of the liquid layer, it is possible to prevent reflection between the CRT side of the fifth lens unit and the face plate to enhance the contrast of an image.

Figure 1:
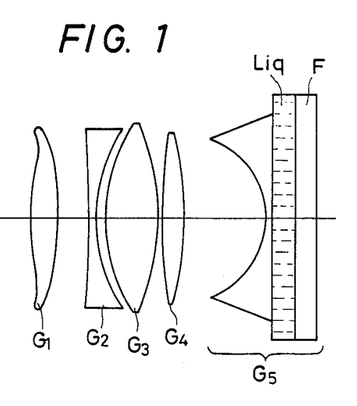
FIG. 1 is a sectional view showing the structure of Group I of a projection lens for a projector according to this invention.
Figure 2:
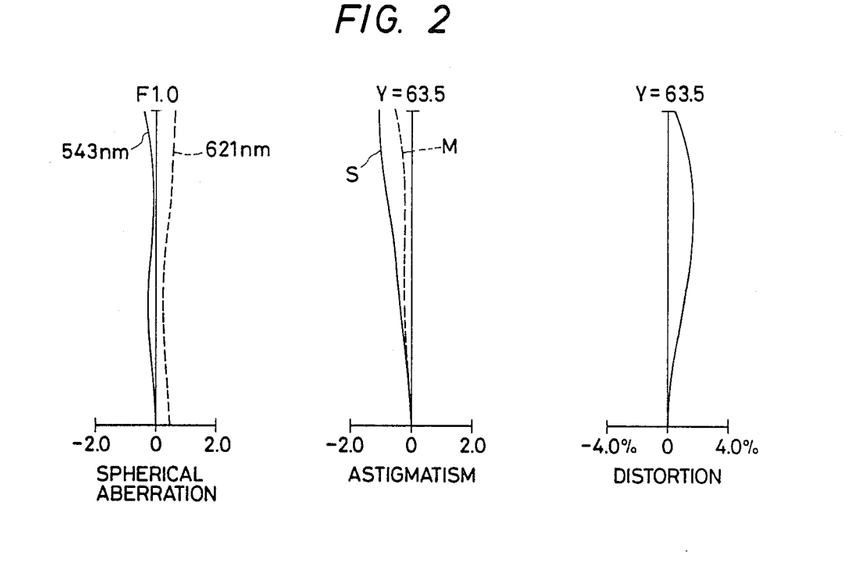
FIGS. 2 to 5 illustrate aberration curves of Embodiments 1 through 4.

(Group 1)
Embodiment 1 f = 90.00  Aperture ratio 1:1.00  Magnification −0.125
Half angle of view 30.1°  f/f₂n₂ = −0.46  f/f₁₂ = 0.05
$f/f_1 = 0.6$  $f/f_2 = -0.73$  $f/f_2 = 0.96$  $f/f_4 = 0.4$  $f/f_5 = -1.06$

| | i | | $r_i$ | $d_i$ | $n_i$ | $v_i$ |
|---|---|---|---|---|---|---|
| $G_1$ | 1 | | 100.000 | 15.00 | 1.49425 | 55.0 |
| | 2 | | −212.048 | 16.09 | | |
| $G_2$ | 3 | | −354.442 | 3.50 | 1.57130 | 33.7 |
| | 4 | | 88.851 | 5.40 | | |
| $G_3$ | 5 | | 101.213 | 28.00 | 1.59162 | 61.0 |
| | 6 | | −110.245 | 1.00 | | |
| $G_4$ | 7 | | 267.937 | 13.00 | 1.49425 | 55.0 |
| | 8 | | −189.914 | 44.10 | | |
| $G_5$ | 9 | | −42.093 | 3.50 | 1.49425 | 55.0 |
| | 10 | | ∞ | 13.00 | 1.41190 | |
| | 11 | Liq F | ∞ | 11.50 | 1.54230 | |
| | 12 | | ∞ | | | |

Coefficient of aspherical surfaces · power

Figure 3:
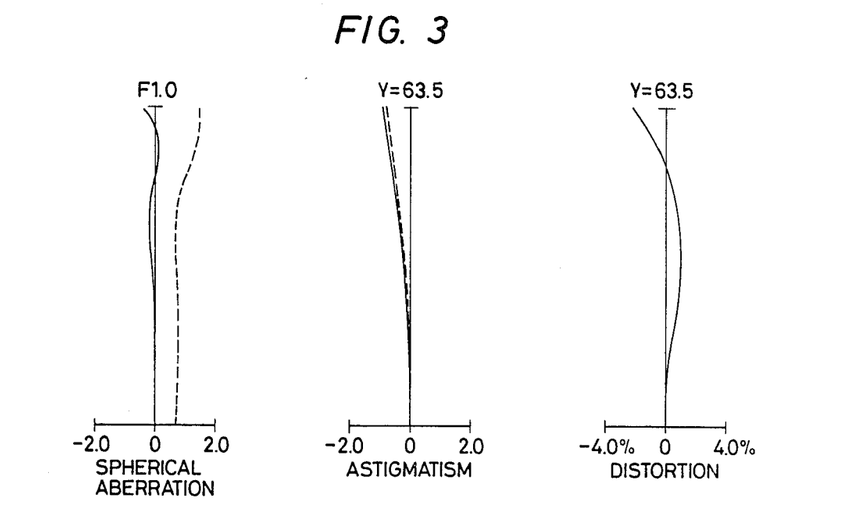

First surface
K = 0.0
$A_1 = -9.60725 \times 10^{-7}$    $P_1 = 4.0000$
$A_2 = -6.56669 \times 10^{-10}$   $P_2 = 6.0000$
$A_3 = 3.31164 \times 10^{-14}$    $P_3 = 8.0000$ Second surface
K = 0.0
$A_1 = -5.48270 \times 10^{-7}$    $P_1 = 4.0000$
$A_2 = -1.78502 \times 10^{-10}$   $P_2 = 6.0000$
$A_3 = -1.40921 \times 10^{-14}$   $P_3 = 8.0000$ Third surface
K = 0.0
$A_1 = -1.07686 \times 10^{-7}$    $P_1 = 4.000$
$A_2 = 3.94051 \times 10^{-10}$    $P_2 = 6.000$
$A_3 = -1.07111 \times 10^{-13}$   $P_3 = 8.0000$ Eighth surface
K = 0.0
$A_1 = -1.00000 \times 10^{-7}$    $P_1 = 4.0000$
$A_2 = -1.74224 \times 10^{-10}$   $P_2 = 6.0000$
$A_3 = 3.31455 \times 10^{-14}$    $P_3 = 8.0000$ Ninth surface
K = −4.06477
$A_1 = -7.81899 \times 10^{-6}$    $P_1 = 4.0000$
$A_2 = 3.68424 \times 10^{-9}$     $P_2 = 6.0000$
$A_3 = -1.72102 \times 10^{-12}$   $P_3 = 8.0000$
$A_4 = 2.89531 \times 10^{-16}$    $P_4 = 10.0000$ Embodiment 2 f = 90.00  Aperture ratio 1:1.00  Magnification −0.125
Half angle of view 30.8°, $f/f_{2n2} = -0.12$   $f/f_{12} = 0.19$
$f/f_1 = 0.36$  $f/f_2 = -0.19$  $f/f_3 = 0.9$  $f/f_4 = 0.2$
$f/f_5 = -1.10$

| | i | | $r_i$ | $d_i$ | $n_i$ | $v_i$ |
|---|---|---|---|---|---|---|
| $G_1$ | 1 | | 87.837 | 12.00 | 1.49425 | 55.0 |
| | 2 | | 300.007 | 2.38 | | |
| $G_2$ | 3 | | 141.212 | 3.50 | 1.57130 | 33.7 |
| | 4 | | 91.737 | 20.33 | | |
| $G_3$ | 5 | | 104.557 | 30.00 | 1.59162 | 61.0 |
| | 6 | | −121.857 | 1.00 | | |
| $G_4$ | 7 | | −3570.313 | 11.78 | 1.49425 | 55.0 |
| | 8 | | −214.323 | 46.87 | | |
| $G_5$ | 9 | | −40.404 | 3.50 | 1.49425 | 55.0 |
| | 10 | | ∞ | 13.00 | 1.41190 | |
| | 11 | Liq F | ∞ | 11.50 | 1.54230 | |
| | 12 | | ∞ | | | |

Coefficient of aspherical surfaces · power

First surface
K = 0.0
$A_1 = -8.98141 \times 10^{-7}$    $P_1 = 4.0000$
$A_2 = -3.68145 \times 10^{-10}$   $P_2 = 6.0000$ -continued

| Embodiment 2 | |
|---|---|
| $A_3 = -5.18148 \times 10^{-14}$ | $P_3 = 8.0000$ |
| Second surface | |
| $K = 0.0$ | |
| $A_1 = 5.88184 \times 10^{-8}$ | $P_1 = 4.0000$ |
| $A_2 = -5.73204 \times 10^{-11}$ | $P_2 = 6.0000$ |
| $A_3 = -1.31709 \times 10^{-13}$ | $P_3 = 8.0000$ |
| Third surface | |
| $K = 0.0$ | |
| $A_1 = 3.49194 \times 10^{-7}$ | $P_1 = 4.0000$ |
| $A_2 = 2.45223 \times 10^{-10}$ | $P_2 = 6.0000$ |
| $A_3 = -1.44608 \times 10^{-13}$ | $P_3 = 8.0000$ |
| Eighth surface | |
| $K = 0.0$ | |
| $A_1 = 1.03990 \times 10^{-7}$ | $P_1 = 4.0000$ |
| $A_2 = -1.49714 \times 10^{-10}$ | $P_2 = 6.0000$ |
| $A_3 = 3.79502 \times 10^{-14}$ | $P_3 = 8.0000$ |
| Ninth surface | |
| $K = -2.92582$ | |
| $A_1 = -6.49927 \times 10^{-6}$ | $P_1 = 4.0000$ |
| $A_2 = 2.15944 \times 10^{-9}$ | $P_2 = 6.0000$ |
| $A_3 = -9.65528 \times 10^{-13}$ | $P_3 = 8.0000$ |
| $A_4 = 1.58834 \times 10^{-16}$ | $P_4 = 10.0000$ |

Embodiment 3

Figure 4:
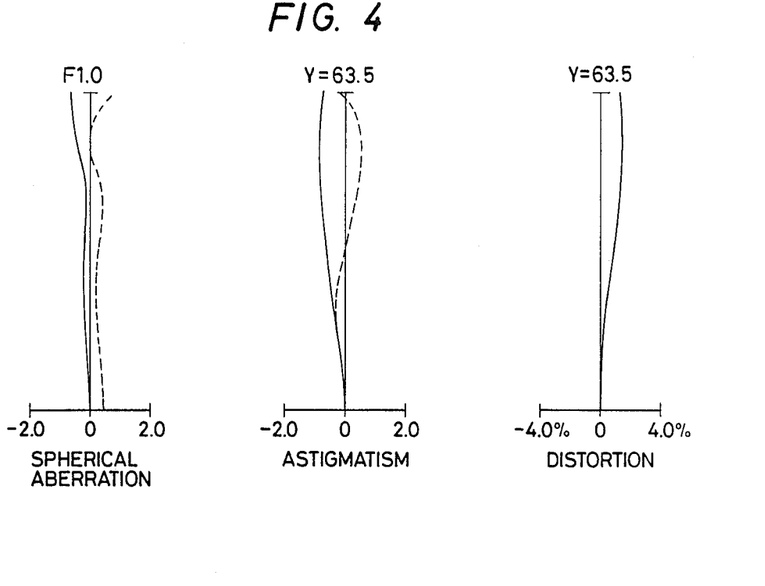

$f = 90.00$  Aperture ratio 1:1.00  Magnification $-0.125$
Half angle of view 30.1°, $f/f_{2n2} = -0.69$  $f/f_{12} = -0.21$
$f/f_1 = 0.7$  $f/f_2 = -1.12$  $f/f_3 = 1.06$  $f/f_4 = 0.57$
$f/f_5 = -1.02$

| | i | | $r_i$ | $d_i$ | $n_i$ | $\nu_i$ |
|---|---|---|---|---|---|---|
| $G_1$ | 1 | | 99.992 | 16.00 | 1.49425 | 55.0 |
| | 2 | | −167.517 | 17.14 | | |
| $G_2$ | 3 | | −135.098 | 3.50 | 1.62444 | 36.3 |
| | 4 | | 80.274 | 4.23 | | |
| $G_3$ | 5 | | 92.884 | 30.00 | 1.64275 | 60.1 |
| | 6 | | −114.641 | 1.00 | | |
| $G_4$ | 7 | | 147.040 | 15.00 | 1.49425 | 55.0 |
| | 8 | | −159.356 | 46.26 | | |
| $G_5$ | 9 | | −43.585 | 3.50 | 1.49425 | 55.0 |
| | 10 | | ∞ | 13.00 | 1.41190 | |
| | 11 | Liq F | ∞ | 11.50 | 1.54230 | |
| | 12 | | ∞ | | | |

Coefficient of aspherical surfaces · power

Figure 5:
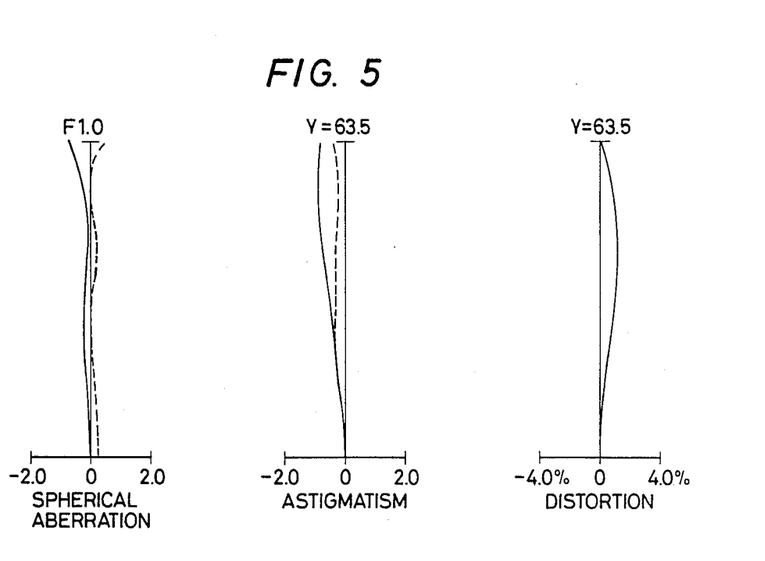
Figure 6:
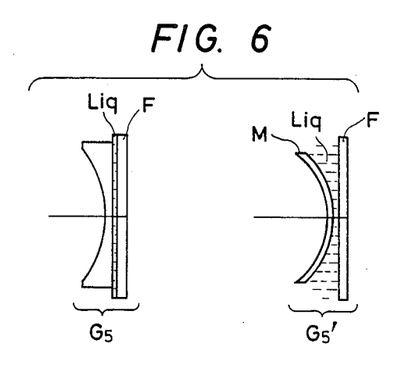
FIG. 6 is a sectional view showing a modification of a fifth lens unit.

First surface
$K = 1.34892$
$A_1 = -1.02937 \times 10^{-6}$  $P_1 = 4.0000$
$A_2 = -3.81837 \times 10^{-10}$  $P_2 = 6.0000$
$A_3 = -1.37352 \times 10^{-13}$  $P_3 = 8.0000$
Second surface
$K = 0.0$
$A_1 = 3.92904 \times 10^{-7}$  $P_1 = 4.0000$
$A_2 = -5.45776 \times 10^{-11}$  $P_2 = 6.0000$
$A_3 = -1.07311 \times 10^{-13}$  $P_3 = 8.0000$
Third surface
$K = 0.0$
$A_1 = 8.07718 \times 10^{-8}$  $P_1 = 4.0000$
$A_2 = 2.23693 \times 10^{-10}$  $P_2 = 6.0000$
$A_3 = -2.53365 \times 10^{-14}$  $P_3 = 8.0000$
Eighth surface
$K = 0.0$
$A_1 = -1.59851 \times 10^{-8}$  $P_1 = 4.0000$
$A_2 = -1.46401 \times 10^{-10}$  $P_2 = 6.0000$
$A_3 = 4.98070 \times 10^{-14}$  $P_3 = 8.0000$
Ninth surface
$K = -3.74612$
$A_1 = -5.95154 \times 10^{-6}$  $P_1 = 4.0000$
$A_2 = 1.50910 \times 10^{-9}$  $P_2 = 6.0000$
$A_3 = -5.12277 \times 10^{-13}$  $P_3 = 8.0000$
$A_4 = -4.25745 \times 10^{-17}$  $P_4 = 10.0000$ Embodiment 4

$f = 90.00$  Aperture ratio 1:1.00  Magnification $-0.125$
Half angle of view 30.2°, $f/f_{2n2} = -0.63$  $f/f_{12} = -0.16$
$f/f_1 = 0.65$  $f/f_2 = -1.0$  $f/f_3 = 1.05$  $f/f_4 = 0.51$
$f/f_5 = -1.02$

| | i | | $r_i$ | $d_i$ | $n_i$ | $\nu_i$ |
|---|---|---|---|---|---|---|
| $G_1$ | 1 | | 99.972 | 16.00 | 1.49425 | 55.0 |
| | 2 | | −209.349 | 17.88 | | |
| $G_2$ | 3 | | −150.759 | 3.50 | 1.59200 | 30.0 |
| | 4 | | 83.604 | 4.23 | | |
| $G_3$ | 5 | | 92.831 | 30.00 | 1.62307 | 60.3 |
| | 6 | | −109.967 | 1.00 | | |
| $G_4$ | 7 | | 147.040 | 15.00 | 1.49425 | 55.0 |
| | 8 | | −191.743 | 45.48 | | |
| $G_5$ | 9 | | −43.585 | 3.50 | 1.49425 | 55.0 |
| | 10 | | ∞ | 13.00 | 1.41190 | |
| | 11 | Liq F | ∞ | 11.50 | 1.54230 | |
| | 12 | | ∞ | | | |

Coefficient of aspherical surfaces · power

First surface
$K = 1.59238$
$A_1 = -9.60725 \times 10^{-7}$  $P_1 = 4.0000$
$A_2 = -2.65743 \times 10^{-10}$  $P_2 = 6.0000$
$A_3 = -9.05243 \times 10^{-14}$  $P_3 = 8.0000$
Second surface
$K = 0.0$
$A_1 = -2.68472 \times 10^{-7}$  $P_1 = 4.0000$
$A_2 = -3.62090 \times 10^{-11}$  $P_2 = 6.0000$
$A_3 = -6.50652 \times 10^{-14}$  $P_3 = 8.0000$
Third surface
$K = 0.0$
$A_1 = 7.97598 \times 10^{-8}$  $P_1 = 4.0000$
$A_2 = 4.69099 \times 10^{-11}$  $P_2 = 6.0000$
$A_3 = -1.19729 \times 10^{-14}$  $P_3 = 8.0000$
Eighth surface
$K = 0.0$
$A_1 = -2.08932 \times 10^{-8}$  $P_1 = 4.0000$
$A_2 = -2.75202 \times 10^{-10}$  $P_2 = 6.0000$
$A_3 = 9.38775 \times 10^{-14}$  $P_3 = 8.0000$
Ninth surface
$K = -3.33883$
$A_1 = -5.94195 \times 10^{-6}$  $P_1 = 4.0000$
$A_2 = 1.55040 \times 10^{-9}$  $P_2 = 6.0000$
$A_3 = -4.75090 \times 10^{-13}$  $P_3 = 8.0000$
$A_4 = -4.34793 \times 10^{-17}$  $P_4 = 10.0000$

Group 2

Figure 7:
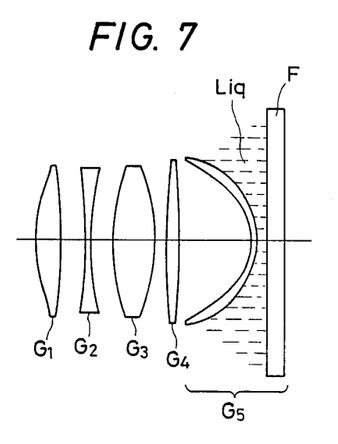
FIG. 7 is a sectional view showing the structure of Group 2 of a projection lens for a projector according to this invention.

If the second group lens is made to comprise a plastic lens and the third group lens made to comprise a glass lens, a lens with less variation in backfocus due to the temperature change may be obtained.

Embodiment 5

Figure 8:
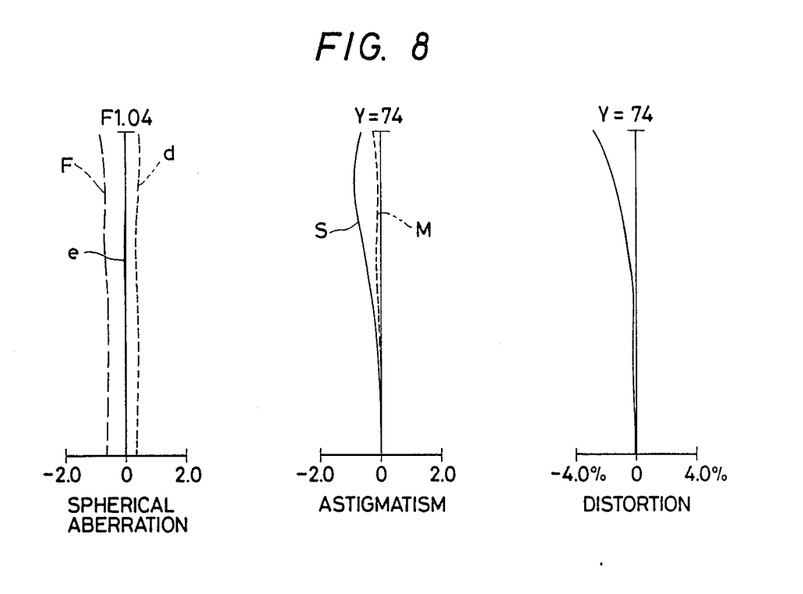
FIGS. 8 through 10 illustrate aberration curves of Embodiments 5 to 7, respectively.

$f = 86.27$  Aperture ratio 1:1.04
Magnification $-0.12987$  Half angle of view 35°
$d_2/d_4 = 1.16$  $f_2/f_{12} = -0.68$  $f/f_4 = 0.16$

| | i | $r_i$ | $d_i$ | $n_i$ | $\nu_i$ |
|---|---|---|---|---|---|
| $G_1$ | 1 | 73.359 | 15.32 | 1.49407 | 55.0 |
| | 2 | −562.040 | 14.01 | | |
| $G_2$ | 3 | −358.084 | 3.47 | 1.57096 | 33.7 |
| | 4 | 165.430 | 12.05 | | |
| $G_3$ | 5 | 116.271 | 25.00 | 1.59143 | 61.0 |
| | 6 | −109.570 | 6.51 | | |
| $G_4$ | 7 | 408.278 | 7.00 | 1.49407 | 55.0 |
| | 8 | −713.791 | 42.36 | | |
| | 9 | −30.929 | 3.47 | 1.49407 | 55.0 |

-continued

Embodiment 5

| | | $r_i$ | $d_i$ | $n_i$ | $\nu_i$ |
|---|---|---|---|---|---|
| $G_5$ | 10 | −47.243 | 6.02 | 1.44550 | 64.4 |
| | 11 Liq F | ∞ | 10.30 | 1.54212 | 59.5 |
| | 12 | ∞ | | | |

Coefficient of aspherical surfaces · power

First surface
$K = -9.05431 \times 10^{-2}$
$A_1 = -4.60758 \times 10^{-7}$    $P_1 = 4.000$
$A_2 = -2.26884 \times 10^{-10}$    $P_2 = 6.000$
$A_3 = -9.27096 \times 10^{-14}$    $P_3 = 8.000$ Second surface
$K = -6.54288 \times 10^{-2}$
$A_1 = -1.54891 \times 10^{-7}$    $P_1 = 4.000$
$A_2 = -1.74919 \times 10^{-10}$    $P_2 = 6.000$
$A_3 = 1.70525 \times 10^{-14}$    $P_3 = 8.000$ Third surface
$K = 5.45710 \times 10^{-3}$
$A_1 = -4.10152 \times 10^{-7}$    $P_1 = 4.000$
$A_2 = 1.60442 \times 10^{-10}$    $P_2 = 6.000$
$A_3 = 3.04888 \times 10^{-14}$    $P_3 = 8.000$ Eighth surface
$K = -1.89068 \times 10^{-2}$
$A_1 = 1.15004 \times 10^{-7}$    $P_1 = 4.000$
$A_2 = 4.73235 \times 10^{-11}$    $P_2 = 6.000$
$A_3 = -2.00578 \times 10^{-14}$    $P_3 = 8.000$ Ninth surface
$K = -3.58298$
$A_1 = -8.39736 \times 10^{-6}$    $P_1 = 4.000$
$A_2 = 4.61943 \times 10^{-9}$    $P_2 = 6.000$
$A_3 = -1.95112 \times 10^{-12}$    $P_3 = 8.000$
$A_4 = 2.78136 \times 10^{-16}$    $P_4 = 10.000$

Embodiment 6

Figure 9:
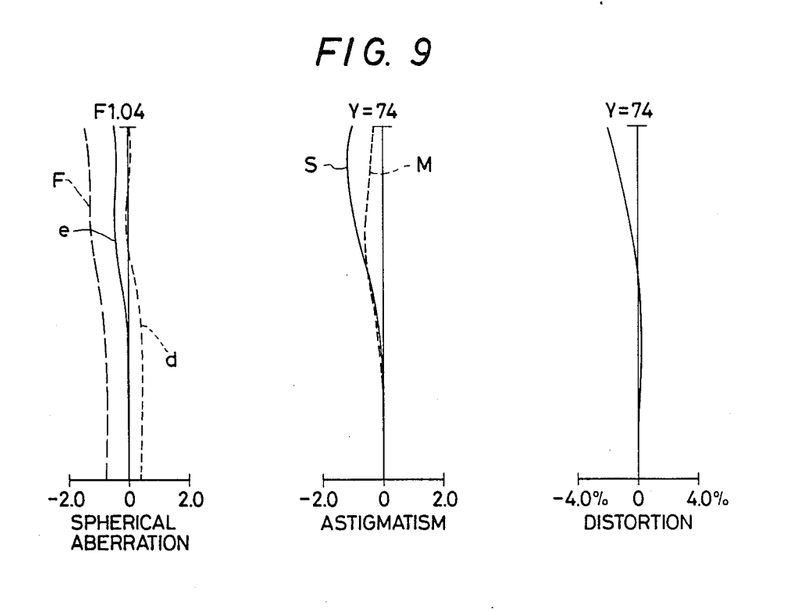

$f = 86.30$    Aperture ratio 1:1.04
Magnification −0.12987    Half angle of view 34.6°
$d_2/d_4 = 0.93$    $f_2/f_{12} = -1.34$    $f/f_4 = 0.16$

| | i | $r_i$ | $d_i$ | $n_i$ | $\nu_i$ |
|---|---|---|---|---|---|
| $G_1$ | 1 | 73.359 | 15.32 | 1.49407 | 55.0 |
| | 2 | −562.040 | 13.85 | | |
| $G_2$ | 3 | −358.084 | 3.47 | 1.57096 | 33.7 |
| | 4 | 300.000 | 14.84 | | |
| $G_3$ | 5 | 161.947 | 20.34 | 1.59143 | 61.0 |
| | 6 | −110.907 | 6.51 | | |
| $G_4$ | 7 | 408.278 | 7.00 | 1.49407 | 55.0 |
| | 8 | −748.692 | 42.36 | | |
| $G_5$ | 9 | −30.860 | 3.47 | 1.49407 | 55.0 |
| | 10 | −47.511 | 6.02 | 1.44550 | 64.4 |
| | 11 Liq F | ∞ | 10.30 | 1.54212 | 59.5 |
| | 12 | ∞ | | | |

Coefficient of aspherical surfaces · power

First surface
$K = -1.22296 \times 10^{-1}$
$A_1 = -4.37242 \times 10^{-7}$    $P_1 = 4.000$
$A_2 = -1.46646 \times 10^{-10}$    $P_2 = 6.000$
$A_3 = -9.68293 \times 10^{-14}$    $P_3 = 8.000$ Second surface
$K = -6.62788 \times 10^{-2}$
$A_1 = -1.67184 \times 10^{-7}$    $P_1 = 4.000$
$A_2 = -1.72941 \times 10^{-10}$    $P_2 = 6.000$
$A_3 = 3.63915 \times 10^{-14}$    $P_3 = 8.000$ Third surface
$K = 4.90355 \times 10^{-3}$
$A_1 = -4.66618 \times 10^{-7}$    $P_1 = 4.000$
$A_2 = 1.04631 \times 10^{-10}$    $P_2 = 6.000$
$A_3 = 6.16645 \times 10^{-14}$    $P_3 = 8.000$ Eighth surface
$K = -1.85485 \times 10^{-2}$
$A_1 = -2.06671 \times 10^{-8}$    $P_1 = 4.000$
$A_2 = 2.72470 \times 10^{-11}$    $P_2 = 6.000$
$A_3 = -2.93326 \times 10^{-14}$    $P_3 = 8.000$ Ninth surface -continued

Embodiment 6

$K = -3.23647$
$A_1 = -8.34782 \times 10^{-6}$    $P_1 = 4.000$
$A_2 = 4.71201 \times 10^{-9}$    $P_2 = 6.000$
$A_3 = -1.90141 \times 10^{-12}$    $P_3 = 8.000$
$A_4 = 2.49407 \times 10^{-16}$    $P_4 = 10.000$

Embodiment 7

Figure 10:
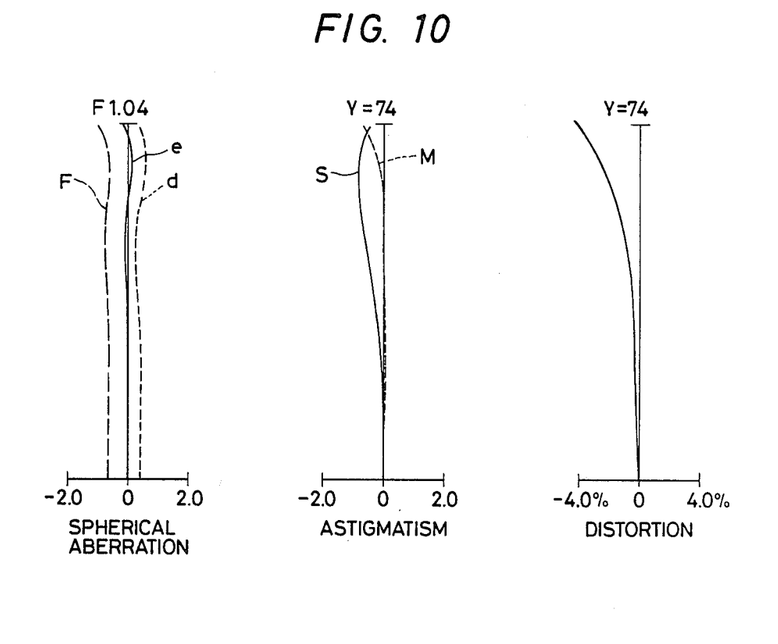

$f = 86.36$    Aperture ratio 1:1.04
Magnification −0.12987    Half angle of view 35.2°
$d_2/d_4 = 1.25$    $f_2/f_{12} = -0.52$    $f/f_4 = 0.18$

| | i | $r_i$ | $d_i$ | $n_i$ | $\nu_i$ |
|---|---|---|---|---|---|
| $G_1$ | 1 | 73.359 | 15.32 | 1.49407 | 55.0 |
| | 2 | −562.040 | 14.48 | | |
| $G_2$ | 3 | −358.084 | 3.47 | 1.57096 | 33.7 |
| | 4 | 140.000 | 11.57 | | |
| $G_3$ | 5 | 106.119 | 26.18 | 1.59143 | 61.0 |
| | 6 | −109.591 | 6.51 | | |
| $G_4$ | 7 | 408.278 | 7.00 | 1.49407 | 55.0 |
| | 8 | −568.269 | 42.36 | | |
| $G_5$ | 9 | −30.941 | 3.47 | 1.49407 | 55.0 |
| | 10 | −47.285 | 6.02 | 1.44550 | 64.4 |
| | 11 Liq F | ∞ | 10.30 | 1.54212 | 59.5 |
| | 12 | ∞ | | | |

Coefficient of aspherical surfaces · power

First surface
$K = -9.71044 \times 10^{-2}$
$A_1 = -4.62625 \times 10^{-7}$    $P_1 = 4.000$
$A_2 = -2.27461 \times 10^{-10}$    $P_2 = 6.000$
$A_3 = -9.28976 \times 10^{-14}$    $P_3 = 8.000$ Second surface
$K = -6.54394 \times 10^{-2}$
$A_1 = -1.53275 \times 10^{-7}$    $P_1 = 4.000$
$A_2 = -1.74467 \times 10^{-10}$    $P_2 = 6.000$
$A_3 = 1.71963 \times 10^{-14}$    $P_3 = 8.000$ Third surface
$K = 5.22738 \times 10^{-3}$
$A_1 = -4.12887 \times 10^{-7}$    $P_1 = 4.000$
$A_2 = 1.59000 \times 10^{-10}$    $P_2 = 6.000$
$A_3 = 2.96903 \times 10^{-14}$    $P_3 = 8.000$ Eighth surface
$K = -1.89203 \times 10^{-2}$
$A_1 = 1.17979 \times 10^{-7}$    $P_1 = 4.000$
$A_2 = 4.97916 \times 10^{-11}$    $P_2 = 6.000$
$A_3 = -1.84748 \times 10^{-14}$    $P_3 = 8.000$ Ninth surface
$K = -3.58010$
$A_1 = -8.39792 \times 10^{-6}$    $P_1 = 4.000$
$A_2 = 4.61907 \times 10^{-9}$    $P_2 = 6.000$
$A_3 = -1.95134 \times 10^{-12}$    $P_3 = 8.000$
$A_4 = 2.78006 \times 10^{-16}$    $P_4 = 10.000$

Figure 11:
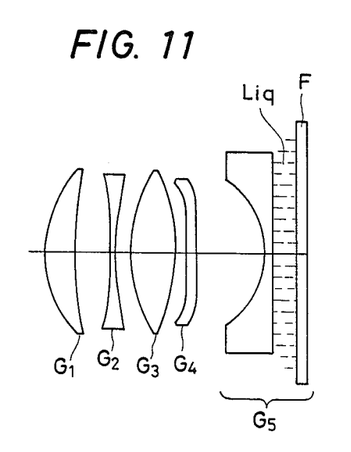
FIG. 11 is a sectional view showing the structure of Group 3 of a projection lens for a projector according to this invention.
Figure 12:
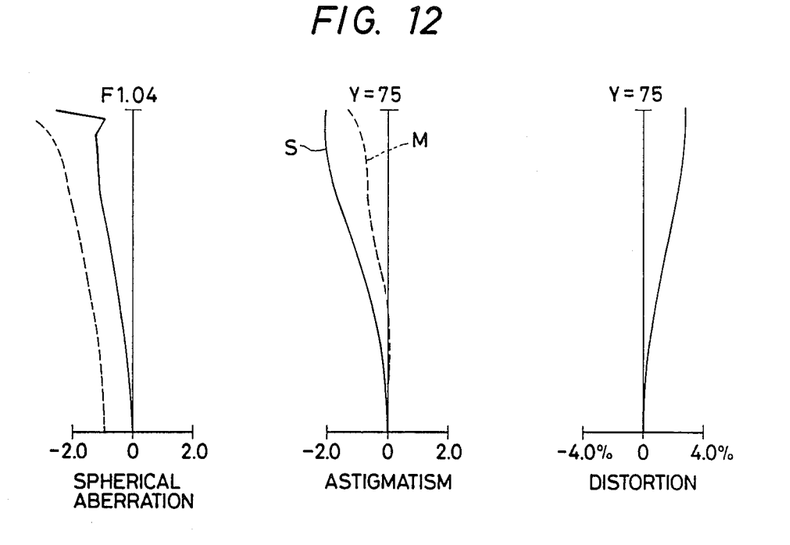
FIGS. 12 to 15 illustrate aberration curves of Embodiments 8 through 11, respectively.

(Group 3)
Embodiment 8

$f = 104.8$    Aperture ratio = 1:1.04    Magnification −0.134228
Half angle of view 28.48°    $d_4/d_2 = 0.44$    $f/f_{3,4} = 1.14$
$f/f_4 = -0.005$

| | | $r_i$ | $d_i$ | $n_i$ | $\nu_i$ |
|---|---|---|---|---|---|
| $G_1$ | 1 | 72.260 | 19.76 | 1.49425 | 55.0 |
| | 2 | 353.891 | 22.85 | | |
| $G_2$ | 3 | −5000.000 | 3.50 | 1.59201 | 31.0 |
| | 4 | 142.545 | 10.00 | | |
| $G_3$ | 5 | 94.234 | 31.00 | 1.59162 | 61.0 |
| | 6 | −112.498 | 6.00 | | |
| | 7 | 13819.940 | 6.25 | 1.49425 | 55.0 |

-continued

(Group 3) Embodiment 8

| | | $r_i$ | $d_i$ | $n_i$ | $\nu_i$ |
|---|---|---|---|---|---|
| $G_4$ | 8 | 5450.921 | 44.50 | | |
| $G_5$ | 9 | −55.883 | 5.50 | 1.62444 | 36.3 |
| | 10 | | 15.99 | 1.41000 | |
| | 11 Liq F | | 7.00 | 1.54230 | |
| | 12 | | | | |

Coefficient of aspherical surfaces · power
First surface
$K = 1.59500 \times 10^{-1}$
$A_1 = -1.18535 \times 10^{-7}$   $P_1 = 4.0000$
$A_2 = -3.01683 \times 10^{-11}$   $P_2 = 6.0000$
$A_3 = 1.98036 \times 10^{-14}$   $P_3 = 8.0000$
$A_4 = -1.14000 \times 10^{-17}$   $P_4 = 10.0000$
Second surface
$K = 4.28866 \times 10$
$A_1 = 1.33678 \times 10^{-7}$   $P_1 = 4.0000$
$A_2 = -1.06863 \times 10^{-11}$   $P_2 = 6.0000$
$A_3 = -7.06928 \times 10^{-15}$   $P_3 = 8.0000$
$A_4 = -6.01613 \times 10^{-18}$   $P_4 = 10.0000$
Third surface
$K = 1.00000 \times 10^2$
$A_1 = -4.62708 \times 10^{-7}$   $P_1 = 4.0000$
$A_2 = -1.67441 \times 10^{-10}$   $P_2 = 6.0000$
$A_3 = 1.98711 \times 10^{-14}$   $P_3 = 8.0000$
$A_4 = 1.74346 \times 10^{-17}$   $P_4 = 10.0000$
Fourth surface
$K = -4.49960$
$A_1 = -7.37928 \times 10^{-8}$   $P_1 = 4.0000$
$A_2 = -1.39146 \times 10^{-10}$   $P_2 = 6.0000$
$A_3 = -4.02782 \times 10^{-14}$   $P_3 = 8.0000$
$A_4 = 2.22904 \times 10^{-17}$   $P_4 = 10.0000$
Seventh surface
$K = 7.94400 \times 10^{-1}$
$A_1 = -3.48399 \times 10^{-7}$   $P_1 = 4.0000$
$A_2 = -8.65361 \times 10^{-10}$   $P_2 = 6.0000$
$A_3 = 5.92509 \times 10^{-14}$   $P_3 = 8.0000$
$A_4 = 2.45463 \times 10^{-18}$   $P_4 = 10.0000$
Eighth surface
$K = 2.20860$
$A_1 = 1.86078 \times 10^{-7}$   $P_1 = 4.0000$
$A_2 = -9.81148 \times 10^{-10}$   $P_2 = 6.0000$
$A_3 = 2.15728 \times 10^{-13}$   $P_3 = 8.0000$
$A_4 = 2.99293 \times 10^{-17}$   $P_4 = 10.0000$

Figure 13:
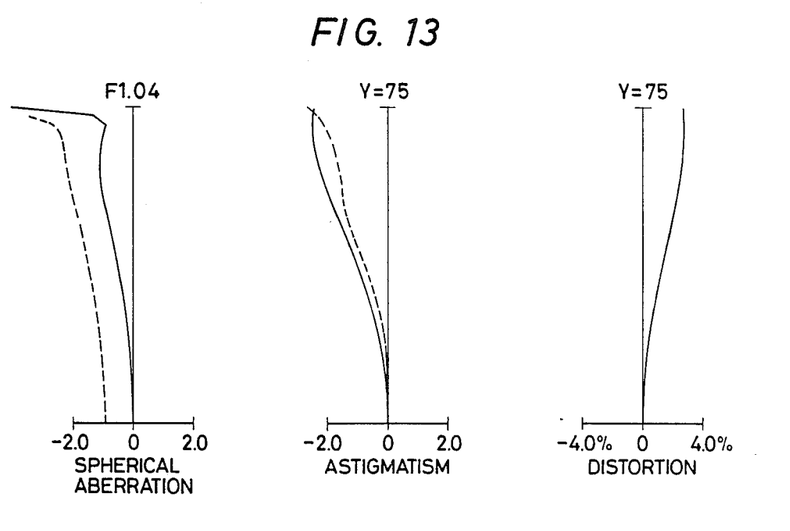

Embodiment 9 f = 104.79  Aperture ratio = 1:1.04  Magnification −0.134228
Half angle of view 28.57°  $d_4/d_2 = 0.44$  $f/f_{3,4} = 1.13$
$f/f_4 = -0.013$

| | | $r_i$ | $d_i$ | $n_i$ | $\nu_i$ |
|---|---|---|---|---|---|
| | Filter | ∞ | 2.00 | 1.51841 | 64.1 |
| | | | 2.00 | | |
| $G_1$ | 1 | 71.014 | 19.75 | 1.49305 | 55.0 |
| | 2 | 362.247 | 22.95 | | |
| $G_2$ | 3 | −5000.000 | 3.50 | 1.59061 | 31.0 |
| | 4 | 142.304 | 10.0 | | |
| $G_3$ | 5 | 93.690 | 30.00 | 1.59162 | 61.0 |
| | 6 | −116.000 | 7.10 | | |
| $G_4$ | 7 | 1380.000 | 6.25 | 1.49305 | 55.0 |
| | 8 | 1030.000 | 42.75 | | |
| $G_5$ | 9 | −56.000 | 5.50 | 1.62444 | 36.3 |
| | 10 | ∞ | 15.99 | 1.41000 | |
| | 11 Liq F | ∞ | 7.00 | 1.54230 | |
| | 12 | ∞ | | | |

Coefficient of aspherical surfaces · power
First surface
$K = 1.59500 \times 10^{-1}$
$A_1 = -1.00050 \times 10^{-7}$   $P_1 = 4.0000$
$A_2 = -2.34830 \times 10^{-11}$   $P_2 = 6.0000$
$A_3 = 4.97640 \times 10^{-15}$   $P_3 = 8.0000$
$A_4 = -2.54010 \times 10^{-18}$   $P_4 = 10.0000$
Second surface
$K = 4.28870 \times 10$
$A_1 = 2.13470 \times 10^{-7}$   $P_1 = 4.0000$
$A_2 = -2.40120 \times 10^{-11}$   $P_2 = 6.0000$
$A_3 = 6.85610 \times 10^{-15}$   $P_3 = 8.0000$
$A_4 = -1.85600 \times 10^{-18}$   $P_4 = 10.0000$
Third surface
$K = 1.00000 \times 10^2$
$A_1 = -2.99030 \times 10^{-7}$   $P_1 = 4.0000$
$A_2 = -1.28520 \times 10^{-10}$   $P_2 = 6.0000$
$A_3 = -3.53380 \times 10^{-14}$   $P_3 = 8.0000$
$A_4 = 1.39550 \times 10^{-17}$   $P_4 = 10.0000$
Fourth surface
$K = -4.49960$
$A_1 = 6.92150 \times 10^{-8}$   $P_1 = 4.0000$
$A_2 = -1.02260 \times 10^{-10}$   $P_2 = 6.0000$
$A_3 = -7.34730 \times 10^{-14}$   $P_3 = 8.0000$
$A_4 = 2.50930 \times 10^{-17}$   $P_4 = 10.0000$
Seventh surface
$K = 7.94400 \times 10^{-1}$
$A_1 = -4.15480 \times 10^{-7}$   $P_1 = 4.0000$
$A_2 = -9.02860 \times 10^{-10}$   $P_2 = 6.0000$
$A_3 = 8.80470 \times 10^{-14}$   $P_3 = 8.0000$
$A_4 = -1.28300 \times 10^{-17}$   $P_4 = 10.0000$
Eighth surface
$K = 2.20860$
$A_1 = 1.22870 \times 10^{-7}$   $P_1 = 4.0000$
$A_2 = -1.00550 \times 10^{-9}$   $P_2 = 6.0000$
$A_3 = 2.31930 \times 10^{-13}$   $P_3 = 8.0000$
$A_4 = -3.92470 \times 10^{-17}$   $P_4 = 10.0000$

Figure 14:
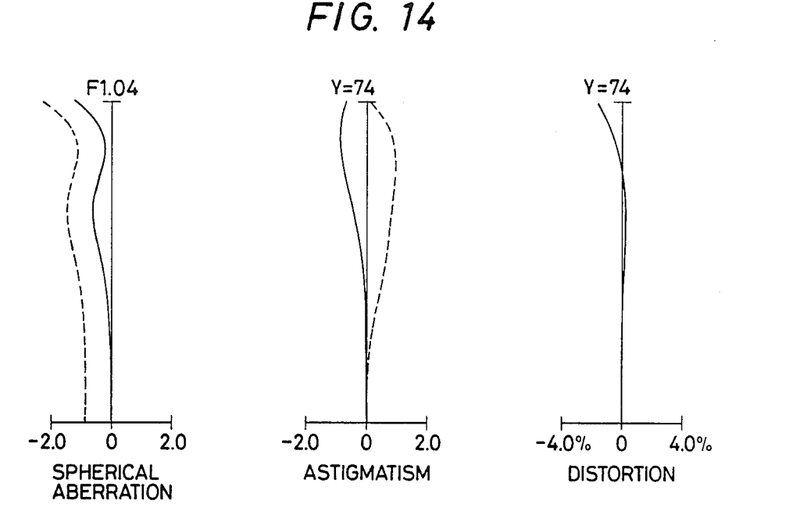

Embodiment 10 f = 95.15  Aperture ratio = 1:1.04  Magnification −0.11764
Half angle of view 32.73°  $d_4/d_2 = 0.47$  $f/f_{34} = 1.12$
$f/f_4 = -0.042$

| | | $r_i$ | $d_i$ | $n_i$ | $\nu_i$ |
|---|---|---|---|---|---|
| $G_1$ | 1 | 67.650 | 21.00 | 1.49305 | 55.0 |
| | 2 | 453.663 | 19.00 | | |
| $G_2$ | 3 | −442.551 | 4.00 | 1.59061 | 31.0 |
| | 4 | 182.031 | 9.00 | | |
| $G_3$ | 5 | 119.640 | 27.00 | 1.59162 | 61.0 |
| | 6 | −83.740 | 4.00 | | |
| $G_4$ | 7 | −900.000 | 9.00 | 1.49305 | 55.0 |
| | 8 | −500.000 | 43.30 | | |
| $G_5$ | 9 | −35.500 | 4.00 | 1.49305 | 55.0 |
| | 10 | | 10.00 | 1.40700 | |
| | 11 Liq F | ∞ | 8.30 | 1.53700 | |
| | 12 | ∞ | | | |

Coefficient of aspherical surfaces · power
First surface
$K = 4.63770 \times 10^{-1}$
$A_1 = -2.32840 \times 10^{-7}$   $P_1 = 4.0000$
$A_2 = 1.78160 \times 10^{-11}$   $P_2 = 6.0000$
$A_3 = 2.86560 \times 10^{-14}$   $P_3 = 8.0000$
$A_4 = -1.43240 \times 10^{-17}$   $P_4 = 10.0000$
Second surface
$K = 4.79190 \times 10$
$A_1 = 2.34700 \times 10^{-7}$   $P_1 = 4.0000$
$A_2 = 2.11820 \times 10^{-11}$   $P_2 = 6.0000$
$A_3 = 3.39060 \times 10^{-14}$   $P_3 = 8.0000$
$A_4 = -3.57960 \times 10^{-17}$   $P_4 = 10.0000$
Third surface
$K = 4.11344 \times 10$
$A_1 = -1.42270 \times 10^{-6}$   $P_1 = 4.0000$
$A_2 = -1.76880 \times 10^{-10}$   $P_2 = 6.0000$
$A_3 = -1.05120 \times 10^{-13}$   $P_3 = 8.0000$
$A_4 = 5.71440 \times 10^{-17}$   $P_4 = 10.0000$
Fourth surface -continued

Embodiment 10

| | |
|---|---|
| $K = -1.86100 \times 10$ | |
| $A_1 = -3.35060 \times 10^{-7}$ | $P_1 = 4.0000$ |
| $A_2 = -1.59830 \times 10^{-10}$ | $P_2 = 6.0000$ |
| $A_3 = 9.20280 \times 10^{-14}$ | $P_3 = 8.0000$ |
| $A_4 = 3.87150 \times 10^{-17}$ | $P_4 = 10.0000$ |
| Seventh surface | |
| $K = 1.29510 \times 10^2$ | |
| $A_1 = -1.66725 \times 10^{-7}$ | $P_1 = 4.0000$ |
| $A_2 = -2.68060 \times 10^{-10}$ | $P_2 = 6.0000$ |
| $A_3 = 5.50370 \times 10^{-15}$ | $P_3 = 8.0000$ |
| $A_4 = -1.91330 \times 10^{-17}$ | $P_4 = 10.0000$ |
| Eighth surface | |
| $K = 6.77590 \times 10$ | |
| $A_1 = -6.90050 \times 10^{-8}$ | $P_1 = 4.0000$ |
| $A_2 = -2.57870 \times 10^{-10}$ | $P_2 = 6.0000$ |
| $A_3 = -4.82400 \times 10^{-15}$ | $P_3 = 8.0000$ |
| $A_4 = -9.63840 \times 10^{-18}$ | $P_4 = 10.0000$ |
| Ninth surface | |
| $K = -3.59390$ | |
| $A_1 = -5.91790 \times 10^{-6}$ | $P_1 = 4.0000$ |
| $A_2 = 2.60590 \times 10^{-9}$ | $P_2 = 6.0000$ |
| $A_3 = -1.07470 \times 10^{-2}$ | $P_3 = 8.0000$ |
| $A_4 = 1.54840 \times 10^{-16}$ | $P_4 = 10.0000$ |

Embodiment 11

Figure 15:
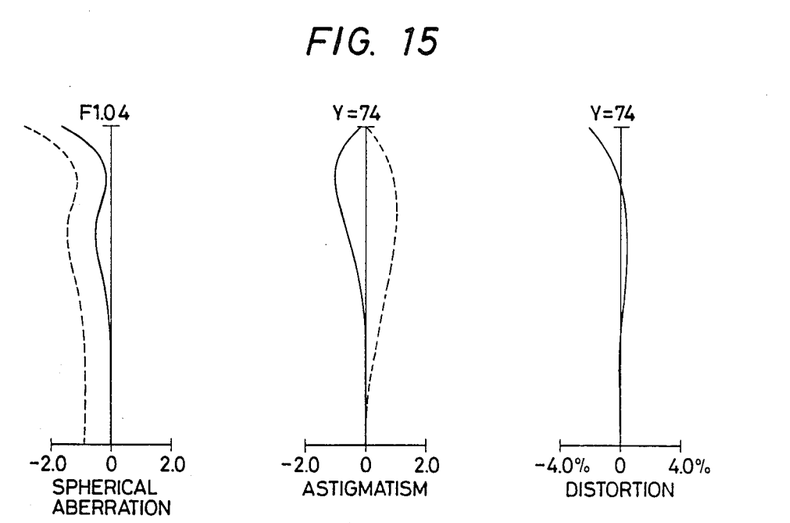

$f = 86.5$ Aperture ratio = 1:1.04 Magnification $-0.12987$
Half angle of view 34.35° $d_4/d_2 = 0.38$ $f/f_{3,4} = 1.07$
$f/f_4 = 0.026$

| | i | $r_i$ | $d_i$ | $n_i$ | $v_i$ |
|---|---|---|---|---|---|
| $G_1$ | 1 | 61.000 | 17.00 | 1.49425 | 55.0 |
| | 2 | 419.078 | 19.13 | | |
| $G_2$ | 3 | −344.842 | 3.50 | 1.57130 | 34.0 |
| | 4 | 170.927 | 7.31 | | |
| $G_3$ | 5 | 120.221 | 25.00 | 1.59162 | 61.0 |
| | 6 | −75.663 | 5.00 | | |
| $G_4$ | 7 | −523.579 | 8.00 | 1.49425 | 55.0 |
| | 8 | −399.262 | 41.61 | | |
| $G_5$ | 9 | −31.716 | 3.50 | 1.49425 | 55.0 |
| | 10 | −50.000 | 6.02 | 1.44566 | |
| | 11 Liq F | ∞ | 10.30 | 1.54230 | |
| | 12 | ∞ | | | |

Coefficient of aspherical surfaces · power

First surface
$K = 4.63767 \times 10^{-1}$
$A_1 = -2.67692 \times 10^{-7}$ $P_1 = 4.0000$
$A_2 = 4.50497 \times 10^{-11}$ $P_2 = 6.0000$
$A_3 = 5.99154 \times 10^{-14}$ $P_3 = 8.0000$
$A_4 = -2.75249 \times 10^{-17}$ $P_4 = 10.0000$
Second surface
$K = 4.79187 \times 10$
$A_1 = 2.99893 \times 10^{-7}$ $P_1 = 4.0000$
$A_2 = 3.49031 \times 10^{-11}$ $P_2 = 6.0000$
$A_3 = 8.65005 \times 10^{-14}$ $P_3 = 8.0000$
$A_4 = -8.97924 \times 10^{-17}$ $P_4 = 10.0000$
Third surface
$K = 4.11344 \times 10$
$A_1 = -1.95930 \times 10^{-6}$ $P_1 = 4.0000$
$A_2 = -2.12492 \times 10^{-10}$ $P_2 = 6.0000$
$A_3 = -2.53631 \times 10^{-13}$ $P_3 = 8.0000$
$A_4 = 1.45680 \times 10^{-16}$ $P_4 = 10.0000$
Fourth surface
$K = -1.86096 \times 10$
$A_1 = -4.59015 \times 10^{-7}$ $P_1 = 4.0000$
$A_2 = -1.94166 \times 10^{-10}$ $P_2 = 6.0000$
$A_3 = 1.36104 \times 10^{-13}$ $P_3 = 8.0000$
$A_4 = 1.00494 \times 10^{-16}$ $P_4 = 10.0000$
Seventh surface
$K = 1.29513 \times 10^2$
$A_1 = -2.21395 \times 10^{-7}$ $P_1 = 4.0000$
$A_2 = -3.66650 \times 10^{-10}$ $P_2 = 6.0000$ -continued

Embodiment 11

$A_3 = -1.85503 \times 10^{-14}$ $P_3 = 8.0000$
$A_4 = -2.76734 \times 10^{-17}$ $P_4 = 10.0000$
Eighth surface
$K = 6.77590 \times 10$
$A_1 = -1.79170 \times 10^{-7}$ $P_1 = 4.0000$
$A_2 = -3.79628 \times 10^{-10}$ $P_2 = 6.0000$
$A_3 = -4.20785 \times 10^{-14}$ $P_3 = 8.0000$
$A_4 = -3.71271 \times 10^{-18}$ $P_4 = 10.0000$
Ninth surface
$K = -3.59387$
$A_1 = -7.76101 \times 10^{-6}$ $P_1 = 4.0000$
$A_2 = 4.16389 \times 10^{-9}$ $P_2 = 6.0000$
$A_3 = -2.07487 \times 10^{-12}$ $P_3 = 8\ 0000$
$A_4 = 3.52266 \times 10^{-16}$ $P_4 = 10.0000$

What is claimed is:

1. A projection lens for a projector comprising, in order from a screen side, a first positive lens unit having at least one aspherical surface, a second negative lens unit, a third positive lens unit, a fourth lens unit, and a fifth negative lens unit with a concave surface having a great curvature directed toward the screen, the projection lens fulfilling the following conditions:

(1) $v_2 < 40$, $50 < v_3$
   (2) $-1.0 < f/(f_2 n_2) < -0.02$
   where
   $v_i$: Abbe number of the $i^{th}$ lens unit
   f: focal length of the entire lens system
   $f_2$: focal length of the second lens unit
   $n_2$: refractive index of the second lens unit.

2. The projection lens of claim 1 wherein:
   (3) $-0.1 < f/f_4 < 0.7$
   where $F_4$: local length of the fourth lens unit.

3. The projections lens of claim 1 wherein:
   $v_1 < 50$, $>_2 < 40$, $v_3 > 50$, $v_4 > 50$.

4. A projection lens for a projector comprising, in order from a screen side, of a first positive lens unit having at least one aspherical surface, a second negative lens unit, a third positive lens unit, a fourth lens unit, and a fifth negative lens unit with a concave surface having a great curvature directed toward the screen, the projection lens fulfilling the following conditions:
   (3) $-2.0 < f_2/f_{1,2} < -0.3$
   (4) $-0.15 < f/f_4 < 0.25$
   where
   $f_{1,2}$: synthesized focal length of the first and second lens units.
   $f_2$: focal length of second lens unit
   $f_4$: focal length of fourth lens unit
   f : focal length of entire lens system .

5. A projection lens for a projector comprising, in order from a screen side, a first lens unit having at least one aspherical surface and including a positive meniscus lens, a second negative lens unit, a third positive lens unit, a fourth lens unit, and a fifth negative lens unit with a concave surface having a great curvature directed toward a screen, said projection lens fulfilling the following conditions:
   (5) $v_2 < 40$, $50 < $ hd $v_3$
   (6) $0.7 < f/f_{3.4} < 1.6$
   (7) $-0.3 < f/f_4 < 0.3$
   (8) $0.01 < d_4/d_2 < 1.0$
   where
   $f_{3,4}$: synthezied focal length of the third and fourth lens units $d_2$: air space between the first and second lens units $d_4$: air space between the second and third lens units f: focal length of entire lens system $f_4$: focal length of fourth lens unit.

6. A projection lens for a projector comprising, in order from a screen side, a first positive lens unit having at least one aspherical surface, a second negative lens unit comprising a double concave lens, a third positive lens unit, a fourth lens unit and a fifth negative lens unit having a concave surface of great curvature directed toward the screen, the projection lens fulfilling the following condition:

$$0.1 < f/f_4 < 0.7$$

where f: focal length of the entire lens system $f_4$: focal length of the fourth lens unit.

* * * * *